US010706170B2

(12) United States Patent
Specht et al.

(10) Patent No.: US 10,706,170 B2
(45) Date of Patent: Jul. 7, 2020

(54) TENANT TABLE SHARING WITH CONTENT SEPARATION

(71) Applicant: SAP SE, Walldorf (DE)

(72) Inventors: Juergen Specht, Gerabronn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 15/460,920

(22) Filed: Mar. 16, 2017

(65) Prior Publication Data

US 2018/0268154 A1 Sep. 20, 2018

(51) Int. Cl.

*G06F 21/62* (2013.01)
*G06F 16/25* (2019.01)
*G06F 16/176* (2019.01)

(52) U.S. Cl.

CPC ........ *G06F 21/6227* (2013.01); *G06F 16/176* (2019.01); *G06F 16/25* (2019.01); *G06F 2221/2141* (2013.01)

(58) Field of Classification Search

CPC .... G06F 16/176; G06F 16/25; G06F 21/6227; G06F 2221/2141

See application file for complete search history.

(56) References Cited

U.S. PATENT DOCUMENTS 6,578,081 B1 * 6/2003 Tominaga ........... G06F 21/6245 707/999.009
7,127,461 B1 * 10/2006 Zhu .................... G06F 21/6218 707/694
7,523,142 B2 4/2009 Driesen et al.
7,657,575 B2 2/2010 Eberlein et al.
7,720,992 B2 5/2010 Brendle et al.
7,734,648 B2 6/2010 Eberlein
7,739,387 B2 6/2010 Eberlein et al.
7,962,920 B2 6/2011 Gabriel et al.
7,971,209 B2 6/2011 Eberlein et al.
8,126,919 B2 2/2012 Eberlein
8,200,634 B2 6/2012 Driesen et al.
8,225,303 B2 7/2012 Wagner et al.
8,250,135 B2 8/2012 Driesen et al.
8,291,038 B2 10/2012 Driesen
8,301,610 B2 10/2012 Driesen et al.
8,356,010 B2 1/2013 Driesen
8,375,130 B2 2/2013 Eberlein et al.
8,380,667 B2 * 2/2013 Driesen ................ G06F 16/213 707/624
8,402,086 B2 3/2013 Driesen et al.
8,407,297 B2 3/2013 Schmidt-Karaca et al.
8,434,060 B2 4/2013 Driesen et al.
8,392,573 B2 5/2013 Lehr et al.

(Continued)

*Primary Examiner* — Neveen Abel Jalil
*Assistant Examiner* — Hubert Cheung
(74) *Attorney, Agent, or Firm* — Fish & Richardson P.C.

(57) ABSTRACT

Implementations include providing a database system that a plurality of tenant systems interact with, providing a shared database schema and a plurality of tenant database schemas, the shared database schema including a shared table, and each tenant database schema being assigned to a respective tenant and including a view into the shared table, which includes a tenant specification field, and a row visibility field, the tenant specification field indicating a tenant, to which a respective row is assigned, and the row visibility field indicating visibility of a respective row to respective tenants.

20 Claims, 8 Drawing Sheets

(56) References Cited

U.S. PATENT DOCUMENTS 8,467,817 B2 6/2013 Said et al.
8,473,942 B2 6/2013 Heidel et al.
8,479,187 B2 7/2013 Driesen et al.
8,555,249 B2 10/2013 Demant et al.
8,560,876 B2 10/2013 Driesen et al.
8,566,784 B2 10/2013 Driesen et al.
8,572,369 B2 10/2013 Schmidt-Karaca et al.
8,604,973 B2 12/2013 Schmidt-Karaca et al.
8,612,406 B1 12/2013 Said et al.
8,645,483 B2 2/2014 Odenheimer et al.
8,706,772 B2 4/2014 Hartig et al.
8,751,573 B2 6/2014 Said et al.
8,762,929 B2 6/2014 Driesen
8,769,704 B2 7/2014 Peddada et al.
8,793,230 B2 7/2014 Engelko et al.
8,805,986 B2 8/2014 Driesen et al.
8,812,554 B1 8/2014 Boulanov
8,868,582 B2 10/2014 Fitzer et al.
8,875,122 B2 10/2014 Driesen et al.
8,880,486 B2 11/2014 Driesen et al.
8,924,384 B2 12/2014 Driesen et al.
8,924,565 B2 12/2014 Lehr et al.
8,930,413 B2 * 1/2015 Tang .................... G06F 16/211 707/803
8,972,934 B2 3/2015 Driesen et al.
8,996,466 B2 3/2015 Driesen
9,003,356 B2 4/2015 Driesen et al.
9,009,105 B2 4/2015 Hartig et al.
9,026,502 B2 5/2015 Driesen et al.
9,026,857 B2 5/2015 Becker et al.
9,031,910 B2 5/2015 Driesen
9,032,406 B2 5/2015 Eberlein
9,069,832 B2 6/2015 Becker et al.
9,069,984 B2 6/2015 Said et al.
9,077,717 B2 7/2015 Said et al.
9,081,805 B1 * 7/2015 Stamen .................. G06F 16/86
9,122,669 B2 9/2015 Demant et al.
9,137,130 B2 9/2015 Driesen et al.
9,182,979 B2 11/2015 Odenheimer et al.
9,183,540 B2 11/2015 Eberlein et al.
9,189,226 B2 11/2015 Driesen et al.
9,223,985 B2 12/2015 Eberlein et al.
9,229,707 B2 1/2016 Borissov et al.
9,251,183 B2 * 2/2016 Mandelstein ......... G06F 16/211
9,256,840 B2 2/2016 Said et al.
9,262,763 B2 2/2016 Peter et al.
9,274,757 B2 3/2016 Said et al.
9,275,120 B2 6/2016 Mayer et al.
2007/0088741 A1 * 4/2007 Brooks ..................... G06F 8/60
2007/0156650 A1 * 7/2007 Becker .................. G06F 16/958
2008/0162622 A1 * 7/2008 Becker .................... G06F 16/25 709/201
2008/0270459 A1 * 10/2008 Grewal ................. G06F 16/256
2010/0153341 A1 6/2010 Driesen et al.
2010/0161648 A1 6/2010 Eberlein et al.
2011/0307695 A1 * 12/2011 Slater .................... G06F 21/604 713/163
2012/0072397 A1 * 3/2012 Esaka ................. G06F 11/1464 707/652
2012/0173589 A1 * 7/2012 Kwon ................. G06F 16/2282 707/803
2013/0132349 A1 5/2013 Hahn et al.
2014/0040294 A1 2/2014 An et al.
2014/0359594 A1 12/2014 Erbe et al.
2017/0329984 A1 * 11/2017 Clough ............... G06F 16/2329
2018/0096165 A1 * 4/2018 Warshavsky ........ G06F 16/2282

* cited by examiner

TENANT TABLE SHARING WITH CONTENT SEPARATION

BACKGROUND

An enterprise can operate a software system that is accessed by a plurality of entities (e.g., customers). For example, the enterprise can provide software services that are accessed by the multiple entities in a multi-tenant configuration. Example software systems can include, without limitation, an enterprise resource planning (ERP) system, a customer relationship management (CRM) system, a supply chain management (SCM) system, and a product lifecycle management (PLM) system.

Infrastructures such as cloud computing infrastructures are based on sharing resources. The sharing principle can be beneficial on the software as a service (SaaS) level where, for example, a single application instance (e.g., ERP application, CRM application, SCM application, PLM application) is shared among multiple groups of users. Such sharing enables significant cost reduction and maintenance efforts. This approach of sharing a single application instance is called multi-tenancy. Multi-tenancy can be described as a principle of delivering SaaS, where a group of consumers (e.g., users, servers), defined as one tenant, share a single application instance with other tenants, and each tenant has its own view onto the application (e.g., in both functional and non-functional aspects).

Multi-tenant architectures enable each tenant to access shared data, and tenant-specific data stored in a database system. Shared data is data that is shared with all tenants of the software system. For example, a vendor of the software system can provide shared data that is the same for all tenants. Tenant-specific data, however, is specific to an individual tenant, and should only be accessed by a respective tenant.

SUMMARY

Implementations of the present disclosure include computer-implemented methods for managing access to, and modification of shared data in multi-tenant systems. In some implementations, actions include providing a database system that each tenant system of a plurality of tenant systems interact with, providing a shared database schema and a plurality of tenant database schemas in the database system, the shared database schema including at least one shared table, and each tenant database schema being assigned to a respective tenant and including a view into the at least one shared table, the at least one shared table including a tenant specification field, and a row visibility field, the tenant specification field indicating a tenant, to which a respective row is assigned, and the row visibility field indicating visibility of a respective row to respective tenants, for a first tenant: reading shared data from the at least one shared table, the shared data being stored in a row having a tenant specification value assigned to a shared tenant, and having an unset hidebit corresponding to the first tenant, and transmitting the shared data to the first tenant, and, for a second tenant: inhibiting reading of shared data from the at least one shared table, the shared data being stored in a row having one of a tenant specification value assigned to another tenant, and a set hidebit corresponding to the second tenant. Other implementations of this aspect include corresponding systems, apparatus, and computer programs, configured to perform the actions of the methods, encoded on computer storage devices.

These and other implementations can each optionally include one or more of the following features: actions further include inserting a first row in the shared table, the first row including changed data based on shared data stored in a second row of the shared table, and setting a hidebit corresponding to the first tenant in the second row of the shared table to inhibit reading of the shared data in the second row by the first tenant; actions further include: inserting a first row in the shared table, the first row including data being stored to the shared table by the first tenant, and setting a value within a tenant specification field of the first row to a unique identifier assigned to the first tenant; actions further include, for the first tenant: identifying one or more rows storing tenant-specific data that is specific to the first tenant based on values within respective tenant specification fields of the one or more rows, and transmitting the tenant-specific data to the first tenant; actions further include, for the second tenant: identifying one or more rows storing tenant-specific data that is specific to the second tenant based on values within respective tenant specification fields of the one or more rows, and transmitting the tenant-specific data to the second tenant; each tenant database schema corresponds to a respective instance of a cloud-based application for a respective tenant; and at least one tenant database schema includes a local table storing tenant-specific data therein.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to managing access to, and modification of shared data in multi-tenant systems. More particularly, implementations of the present disclosure enable tenants to access, and modify shared data stored in a shared table of a database system by implementing row-level content separation between a shared tenant, and multiple tenants. In some examples, and as described in further detail herein, a shared table includes a tenant specification field, and a row visibility (also referred to as hidebits) field. In accordance with implementations of the present disclosure, a tenant is able to view data in a row that includes a tenant specification for the tenant. Further, a tenant is able to view data in a shared row, for which a hidebit is not set for the tenant. A tenant, however, is not able to view data in a shared row, for which a hidebit is set for the tenant. In some examples, a hidebit is set for a tenant, if the tenant modifies data that is included in the shared row.

Implementations can include actions of providing a database system that each tenant system of a plurality of tenant systems interact with, providing a shared database schema and a plurality of tenant database schemas in the database system, the shared database schema including at least one shared table, and each tenant database schema being assigned to a respective tenant and including a view into the at least one shared table, the at least one shared table including a tenant specification field, and a row visibility field, the tenant specification field indicating a tenant, to which a respective row is assigned, and the row visibility field indicating visibility of a respective row to respective tenants, for a first tenant: reading shared data from the at least one shared table, the shared data being stored in a row having a tenant specification value assigned to a shared tenant, and having an unset hidebit corresponding to the first tenant, and transmitting the shared data to the first tenant, and, for a second tenant: inhibiting reading of shared data from the at least one shared table, the shared data being stored in a row having one of a tenant specification value assigned to another tenant, and a set hidebit corresponding to the second tenant.

Figure 1:
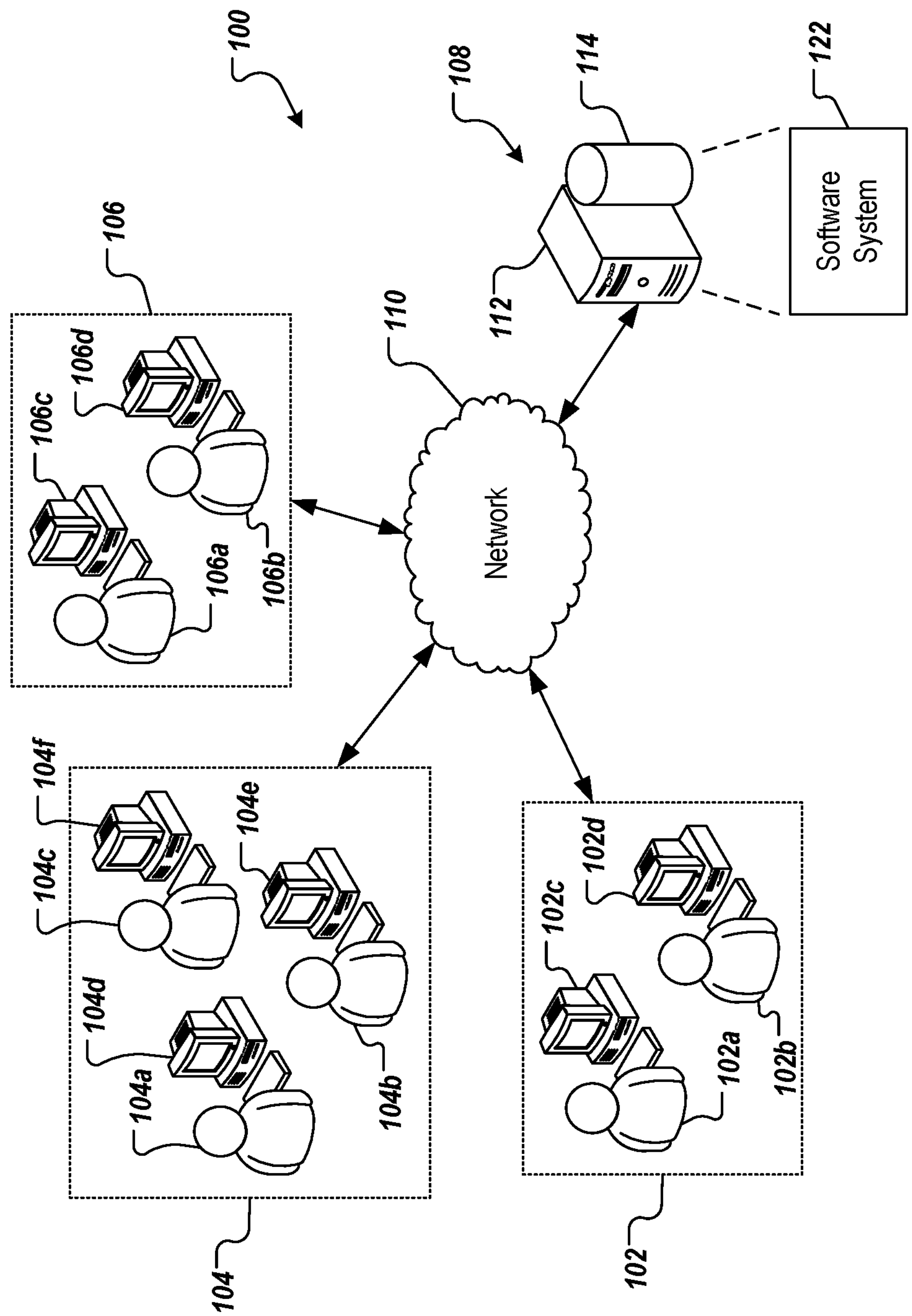
FIG. 1 depicts an example high-level architecture in accordance with implementations of the present disclosure.

FIG. 1 depicts an example architecture 100 in accordance with implementations of the present disclosure. The example architecture 100 is provided as a multi-tenant architecture and includes tenants 102, 104, 106 that communicate with a server system 108 over a network 110. In some examples, each tenant 102, 104, 106 includes multiple users 102*a*, 102*b*; 104*a*, 104*b*, 104*c*; 106*a*, 106*b* that use respective computing devices 102*c*, 102*d*; 104*d*, 104*e*, 104*f*; 106*c*, 106*d* to access the server system 108. In some examples, the computing devices 102*c*, 102*d*; 104*d*, 104*e*, 104*f*; 106*c*, 106*d* can be computing devices such as laptop computers, desktop computers, smartphones, personal digital assistants, portable media players, tablet computers, or other appropriate computing devices that can be used to communicate with the server system 108. Although the tenant system depicted in FIG. 1 includes user-operated computing devices, it is contemplated that one or more tenants can also include server systems. In some implementations, the server system 108 can include one or more computing devices such as a computer server 112 and one or more databases 114. In some implementations, the network 110 can be a public communication network (e.g., the Internet, cellular data network, dialup modems over a telephone network) or a private communications network (e.g., private LAN, leased lines).

In accordance with implementations of the present disclosure, the server system 108 can be an application server system that executes a shared application 122. In the context of a multi-tenant architecture, an instance of the shared application 122 is shared by the tenants 102, 104, 106, e.g., the computing devices 102*c*, 102*d*; 104*d*, 104*e*, 104*f*; 106*c*, 106*d*. Accordingly, an application server instance shared by multiple tenants, where each tenant is provided with a dedicated share of the instance, which is isolated from other shares with regard to performance and data privacy.

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

As introduced above, data stored in a database system can include tenant-specific data (e.g., data only accessible by a respective tenant), and shared data. In some examples, the shared data is provided by a vendor of the application(s) that the tenants are sharing access to. Although the shared content is accessible by all tenants, the shared content is separated from the tenant-specific content. In this manner, the vendor is able to update the shared content (e.g., with patches, support packages, releases) just once for all of the multiple tenants. This reduces the vendor's total cost of ownership (TCO) by conserving computing resources (e.g., processors, memory, bandwidth).

In general, the shared content is provided as read-only (RO) to each of the multiple tenants. However, instances can occur, in which a tenant is to modify shared content. Such instances can occurr, for example, to implement changes (e.g., INSERT, UPDATE, DELETE) to shared tables holding vendor-provided, shared content. This can occur for various reasons including, for example: there is no separation of vendor-provided, shared content from tenant-created content on a database table level; customizing provided by the vendor as a default is copied to another client by the tenant, yet to the same database table; application code generates local content from customizing (e.g., reports); and employing extensibility features provided by the application involves content generation. Consequently, database tables holding vendor-provided, shared content cannot be set to read-only for tenants.

Traditional multi-tenant systems include options for enabling this. For example, shared tables are copied to each tenant to provided respective tenant-local tables. This, however, can significantly increase the TCO, because the memory requirements for storing tenant-local copies multiplies, as well as technical resources required to maintain (e.g., update, patch) each of the multiple copies. Another example can include sharing the database tables, but handling the tenant-issued changes and separating the shared content on a row level. However, data structure changes issued by tenants (e.g., data structure changes using definition languages (DDLs)) are not supported.

In view of the above context, and described in further detail herein, implementations of the present disclosure are directed to managing access to, and modification of shared data in multi-tenant systems. More particularly, implementations of the present disclosure enable tenants to access, and modify shared data stored in a shared table of a database system by implementing row-level content separation between a shared tenant, and multiple tenants. As described in further detail herein, a multi-tenant system can include a shared tenant that accesses data in a database using a shared database schema, and a plurality of tenants that access data in the database using respective tenant database schemes, and/or the shared database schema. In some implementations, the shared database schema manages tenant views into one or more shared tables, where a shared table includes a tenant specification field, and a row visibility (also referred to as hidebits) field.

In some implementations, each row is assigned to a respective tenant, as indicated in the tenant specification field. If a row is assigned to the shared tenant, data of the row is potentially visible to all other tenants. In this manner, shared data (shared content) stored in the row is potentially viewable by all tenants. In some implementations, a tenant is unable to view shared data stored in the row, if a hidebit for the respective tenant is set for the row. Consequently, and as described in further detail herein, a tenant is able to view shared data, if the row is assigned to the shared tenant, and a hidebit corresponding to the tenant is not set. If a row is assigned to a tenant, data of the row is tenant-specific data, and only the particular tenant is able to view the data of the row (no other tenants are able to view the data of the row).

Figure 2:
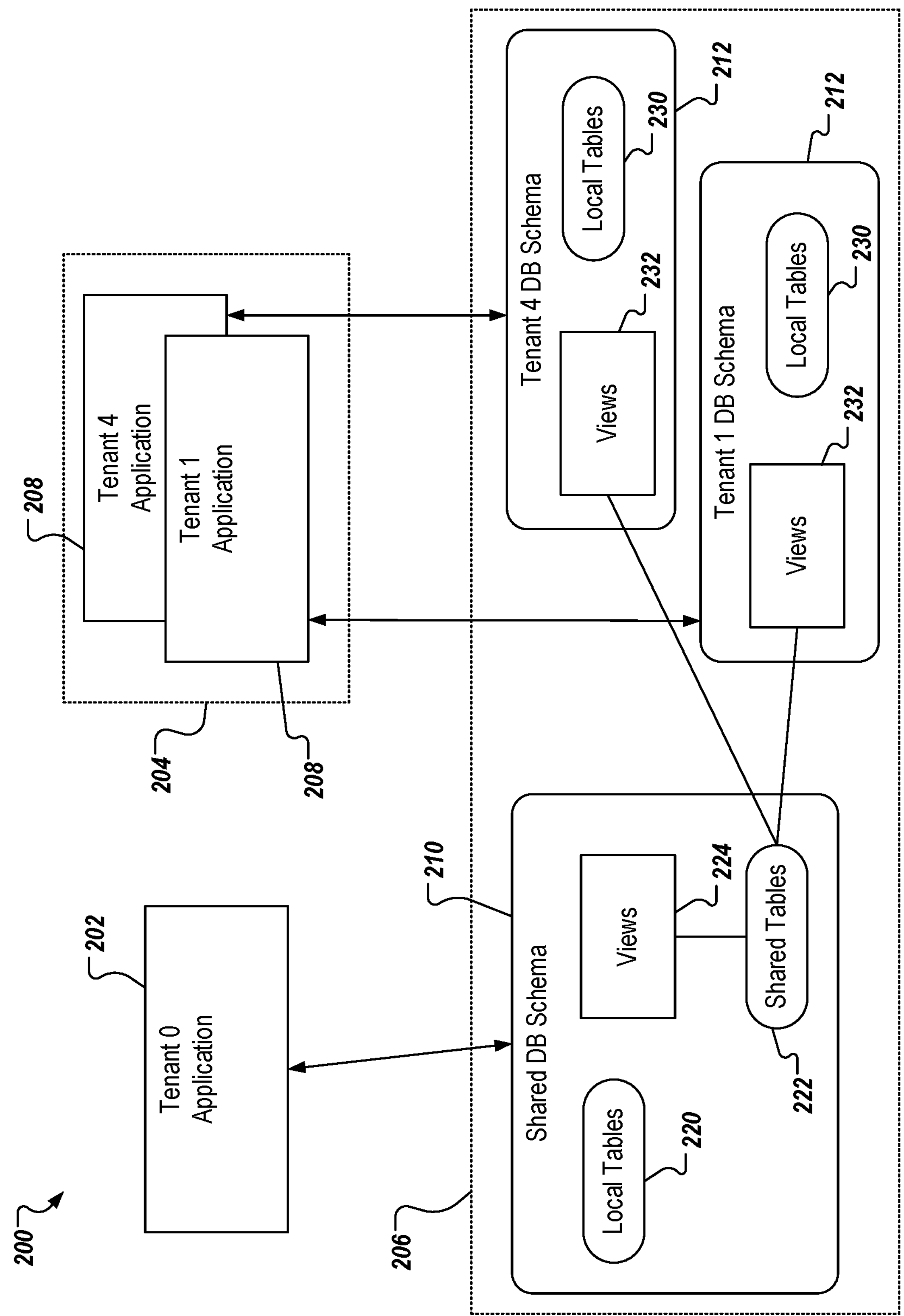
FIG. 2 depicts an example tenant table sharing architecture in accordance with implementations of the present disclosure.

FIG. 2 depicts an example multi-tenant architecture 200 in accordance with implementations of the present disclosure. In the depicted example, the example architecture 200 includes a shared tenant application 202, an application server 204, and a database system 206. The application server 204 hosts application instances 208 for respective tenants. In the example of FIG. 2, two tenants are depicted. It is contemplated, however, that implementations of the present disclosure can be realized with any appropriate number of tenants.

In accordance with implementations of the present disclosure, the shared tenant application accesses data in the database system 206 through a shared database schema 210, and the application instances 208 access data in the database system 206 through respective, tenant-specific database schemas 212. In the depicted example, the shared database schema 210 includes one or more local tables 220, one or more shared tables 222, and on or more views 224 into the one or more shared tables 222. In the depicted example, each of the tenant-specific database schemas includes one or more local tables 230, and one or more views 232 into the one or more shared tables 222 of the shared database schema 210. In some examples, the one or more local tables 230 store tenant-specific data that is specific to the respective tenant. In this manner, tenant-specific data is separated as between tenants.

In accordance with implementations of the present disclosure, shared data (e.g., vendor-provided data that is common to all tenants) is stored in the shared tables 222 of the shared database schema 210, and is accessed by tenants using the views 232 of the respective tenant-specific database schemas 232. In this manner, each tenant is able to view the shared data. More particularly, only a single copy of the shared data is provided, which all tenants can access. In this manner, redundant copies of shared data, one copy for each tenant need not be provided. Consequently, computing resources, such as memory, are conserved.

In some implementations, the shared data can be updated by the vendor. For example, one or more maintenance procedures can be executed, which can impact the shared data. Because only a single copy of the shared data is provided, only the single copy of the shared data need by impacted (e.g., updated) through the maintenance procedure. In this manner, updating redundant copies of the shared data is avoided, thereby conserving computing resources, and time.

In some implementations, and as described in further detail herein, a tenant can modify shared data within a shared table 222. For example, a vendor can provide the shared data, but a tenant is able to customized the shared data to convert the data to tenant-specific data, which is also stored within the shared table 222. This is described in further detail herein with reference to FIGS. 3A-3D.

FIGS. 3A-3D depict example data separation in accordance with implementations of the present disclosure.

With particular reference to FIG. 3, an example multi-tenant architecture 300 is provided, and includes an application server 302, and a database system 304. The application server 302 hosts application instances 306 for respective tenants. In the example of FIG. 3, two tenants are depicted. It is contemplated, however, that implementations of the present disclosure can be realized with any appropriate number of tenants.

In accordance with implementations of the present disclosure, a shared database schema 308, and respective tenant-specific database schemas 312 are provided. In the depicted example, the shared database schema 310 includes a shared table 314 (Table: T2), and the tenant-specific database schemas 312 provide respective views 316 to the shared table 314.

Figure 3A:
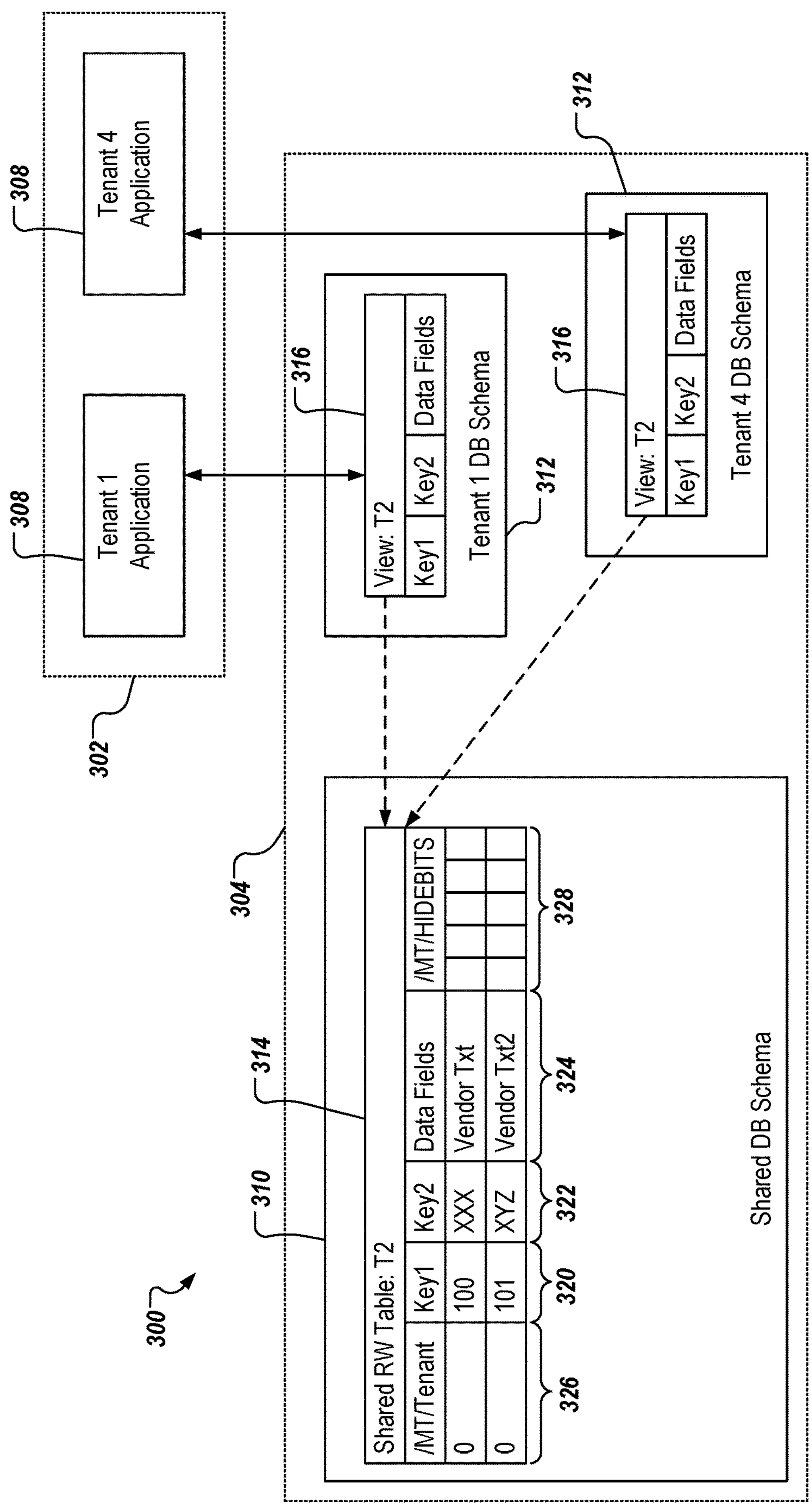
FIGS. 3A-3D depict example data separation in accordance with implementations of the present disclosure.

In the example of FIG. 3A, shared data (e.g., vendor-provided data that is common to all tenants) is stored in the shared table 314, and is accessed by the tenants using the respective views 316 of the respective tenant-specific database schemas 312. In this manner, each tenant is able to view the shared data. Further, the shared table 314 is a read/write (RW) table, meaning that tenants can not only read shared data from the shared table 314, but can write data to the shared table 314, as described in further detail herein. The shared table 314 includes key fields 320, 322, and a data field 324.

In accordance with implementations of the present disclosure, data separation is provided within the shared table 314 using a tenant specification field 326 (/MT/Tenant), and a row visibility (also referred to as hidebits) field 328 (/MT/HIDEBITS). In some implementations, each tenant is assigned a unique identifier. Example identifiers can include integers (e.g., ranging from 0 to 255). For example, a shared tenant can be assigned 0, and all other tenants can be assigned a respective integer in the range of 1 to 255. In the examples of FIGS. 3A-3D, a first tenant is assigned the identifier 1, and a second tenant is assigned the identifier 4.

FIG. 3A can represent an initial point of the multi-tenant system. For example, the depiction of FIG. 3A can result from installing the multi-tenant system, and adding the tenant specification field, and the row visibility field to respective shared tables. For example, during installation of the multi-tenant system, the shared table 314 can be created to include the key fields 320, 322, and the data field 324, which can be populated with shared data (e.g., "Vendor Txt," "Vendor Txt2"). The tenant specification field 326, and the row visibility field 328 are also added to the shared table 314. The row visibility field 328 includes columns for each tenant of the multi-tenant system. In some examples, and as described herein, if a hidebit is set for a row in a column corresponding to a particular tenant, the tenant is not able to view the data of the row, even if the data is shared data.

Installation of the multi-tenant system can further include providing the respective tenant database schemas 312, including the views 316. Accordingly, when the multi-tenant system is brought online, each tenant application 308 is able to access shared data of the shared table 314 through the respective views 316. At the initial point of FIG. 3A, each of the tenants is able to view the shared data "Vendor Txt," and "Vendor Txt2." That is, because the tenant specification field of the respective rows is set to 0 (e.g., shared tenant), and there are no hidebits set in the row visibility field, each tenant is able to view the shared data of the rows of the shared table 314 depicted in FIG. 3A. For example, the view 316 for Tenant 1 of FIG. 3A can be defined as:

View: . . .

WHERE "/MT/TENANT"=0 AND "/MT/HIDEBITS=BITUNSET("/MT/HIDEBITS" 1, 1) OR "/MT/TENANT"=1

In the example view definition, the parameter "/MT/HIDEBITS" 1, 1 indicates a check as to whether a bit in the first column of the row visibility field 328 is set (e.g., equal to 1). Accordingly, the view will return, to Tenant 1, data of the shared table 314 in any row where the /MT/Tenant field is set to 1 (i.e., the unique identifier of Tenant 1), and in any row where the /MT/Tenant field is set to 0, and the hidebit of such a row is not set for Tenant 1. As another example, the view 316 for Tenant 4 of FIG. 3A can be defined as:

View: . . .

WHERE "/MT/TENANT"=0 AND "/MT/HIDEBITS=BITUNSET("/MT/HIDEBITS" 4, 1) OR "/MT/TENANT"=4

In the example view definition, the parameter "/MT/HIDEBITS" 4, 1 indicates a check as to whether a bit in the fourth column of the row visibility field 328 is set (e.g., equal to 1). Accordingly, the view will return, to Tenant 4, data of the shared table 314 in any row where the /MT/Tenant field is set to 4 (i.e., the unique identifier of Tenant 4), and in any row where the /MT/Tenant field is set to 0, and the hidebit of such a row is not set for Tenant 4.

The views are created upon setup of the tenant, and provide the read logic (e.g., for reading data from tables). The instead-of-triggers are defined on the view. For example, if the tenant issues an insert, update or delete (=modify) statement, the database executes the logic in the instead-of-trigger instead of trying to execute modify statement on the view. In some examples, the instead-of-triggers provides the logic, to set (or un-set) the hide-bit in the shared row for a tenant, and compute the content to be written to the shared table with as a tenant content. In some examples, a trigger defined on the shared table, and the trigger is called by the database before insert, update or delete to the shared table.

Figure 3B:
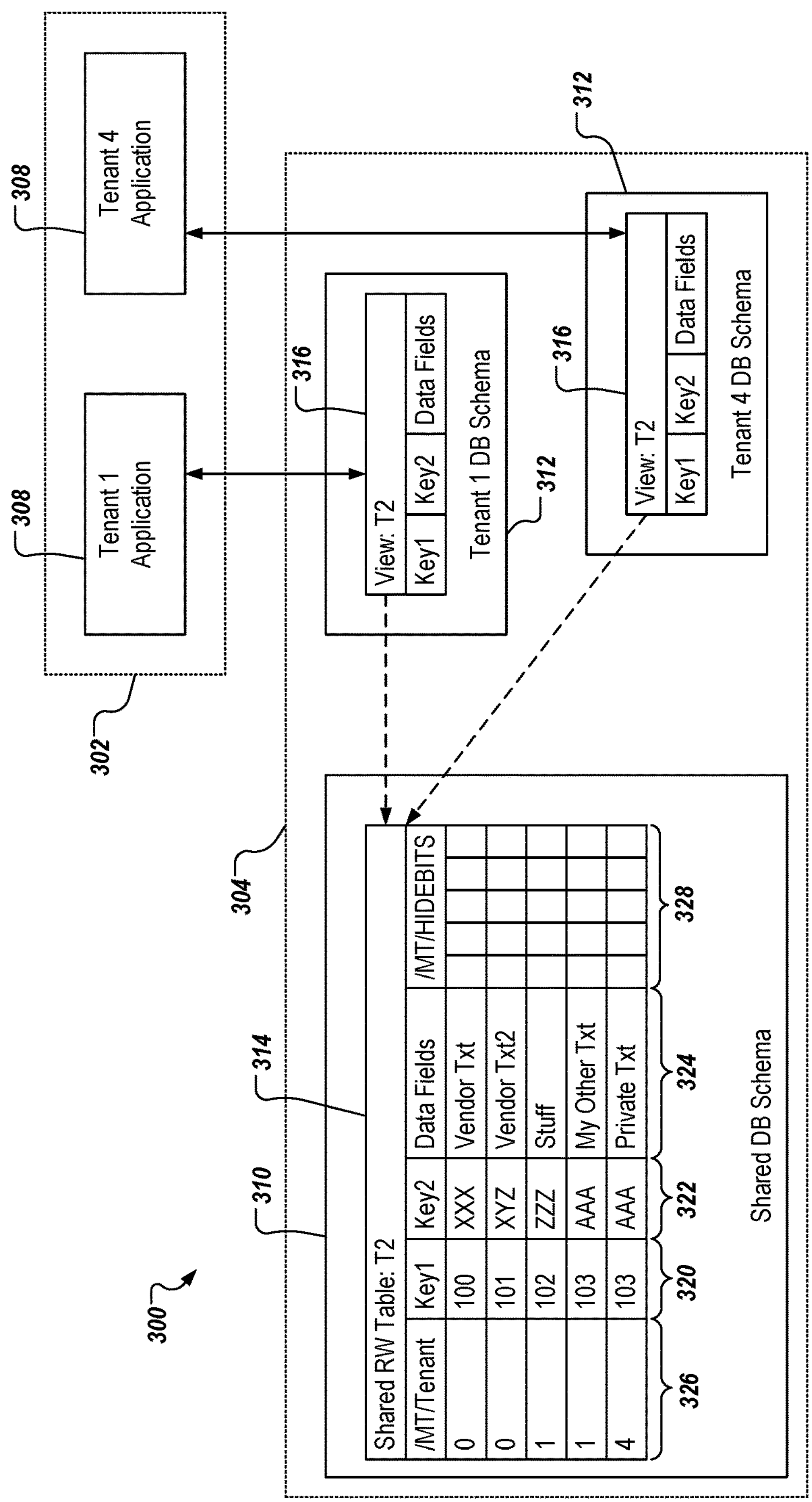

In some implementations, a tenant can store tenant-specific data in the shared table 314. FIG. 3B depicts an example of tenants storing tenant-specific data in the shared table 314. In the depicted example, Tenant 1 has added rows to store tenant-specific data (e.g., "Stuff," "My Other Txt"), and Tenant 4 has added a row to store tenant-specific data (e.g., "Private Txt"). Consequently, for the shared table 314 of FIG. 3B, and continuing with the example view definitions above, Tenant 1 is able to view data of the rows having /MT/Tenant values of 0 and 1, and Tenant 4 is able to view data of the rows having /MT/Tenant values of 0 and 4.

In some implementations, a tenant can modify (e.g., customize) shared data (e.g., executed through a respective instead-of-trigger). For example, a tenant can change the content of shared data, and/or the data structure of shared data. In accordance with implementations of the present disclosure, for shared data that is to be changed, a new row is added, which includes an identifier of the tenant making the change, a copy of the value(s) of the key field(s) of the row, from which the shared data is copied, and the changed data in the data field(s). Further, the hidebit corresponding to the tenant making the change is set in the row visibility field of the row, from which the shared data is copied. In this manner, the tenant making the change is no longer able to view the shared data, as originally provided, but is able to view the data as changed.

Figure 3C:
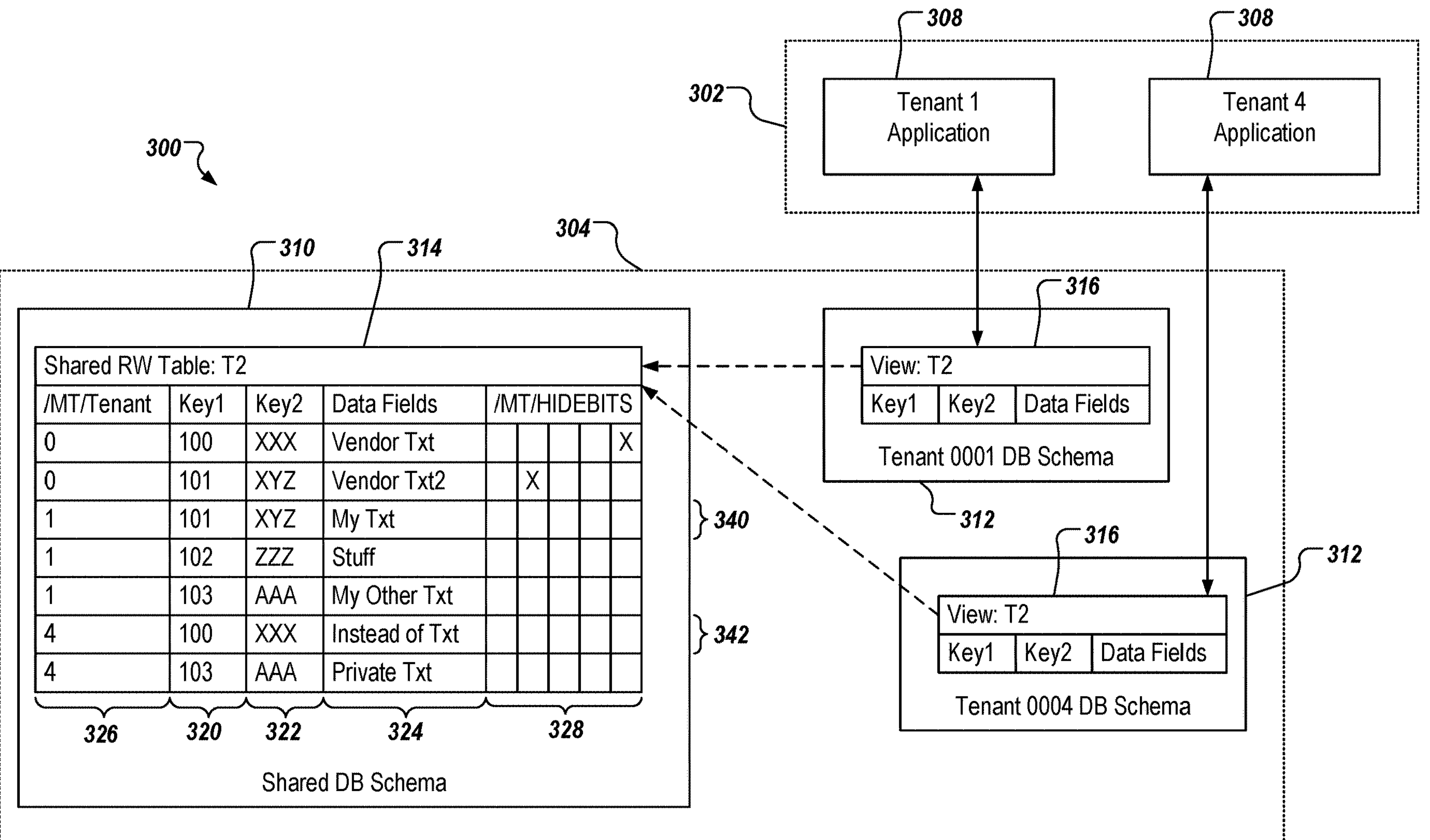
Figure 3D:
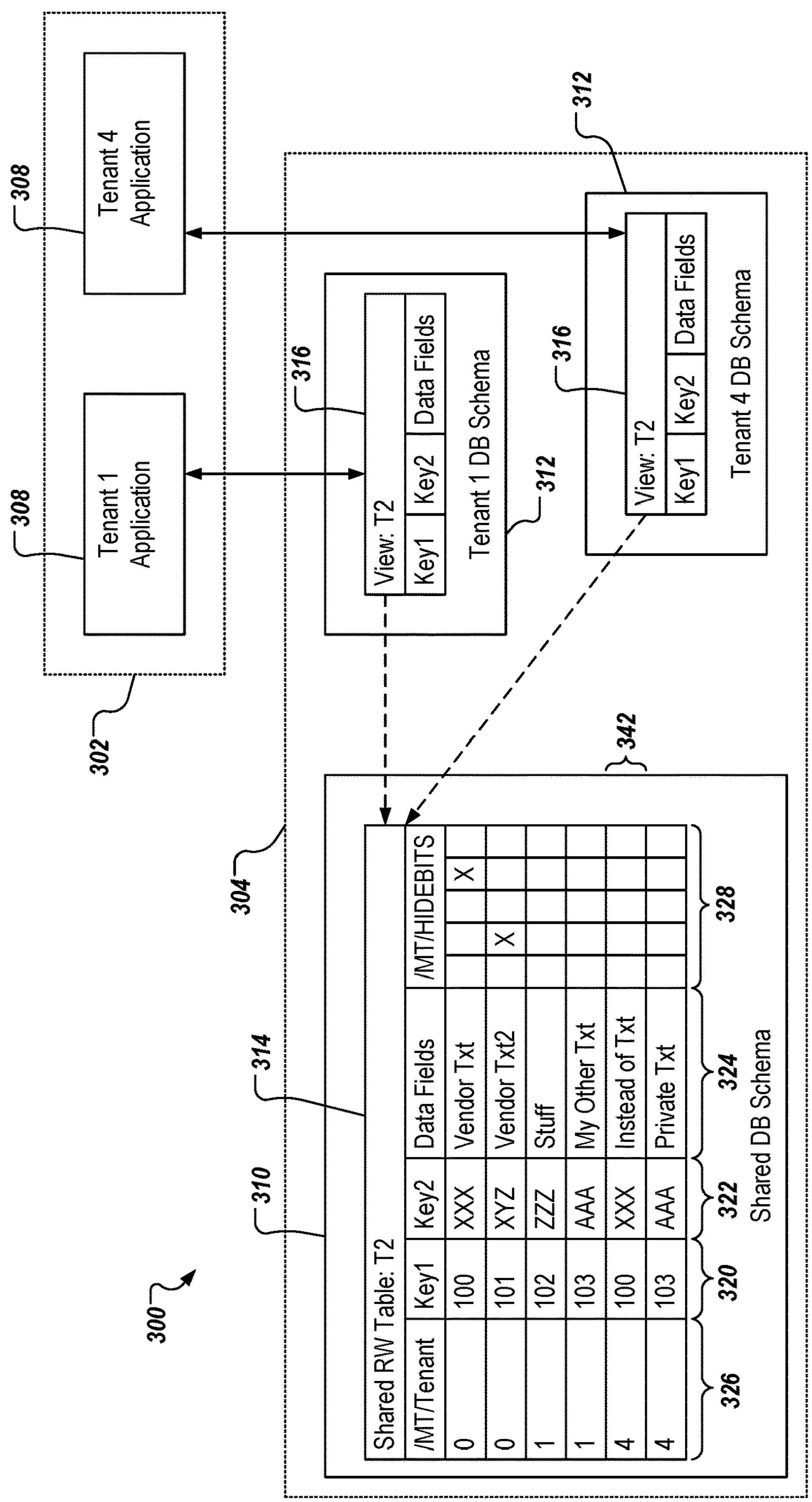

FIG. 3C depicts example changes to shared data made by tenants. More particularly, FIG. 3C depicts a change to the shared data "Vendor Txt2" by Tenant 1, and a change to the shared data "Vendor Txt" by Tenant 4. In the depicted example, Tenant 1 changes the content "Vendor Txt2" of the shared data to "My Txt." Consequently, a new row 340 is added, which includes the value 1 (the unique identifier assigned to Tenant 1) in the tenant specification field 326, and copies of the values of the key fields 320, 322. Further, the hidebit corresponding to the column assigned to Tenant 1 (e.g., the second column of the row visibility field 328, the first column being designated to the shared tenant, Tenant 0). Consequently, subsequent to the change, Tenant 1 is only able to view the changed data of row 340, and is no longer able to view the corresponding shared data.

An update instruction can be executed to perform edits to the shared table 314 in view of the changes implemented by Tenant 1. An example portion of an update instruction can include:

UPDATE . . . SET"/MT/HIDEBITS"=BITSET("/MT/HIDEBITS", 1, 1) WHERE "/MT/TENANT"=0 AND . . .

In the depicted example, Tenant 4 changes the content "Vendor Txt" of the shared data to "Instead of Txt." Consequently, a new row 342 is added, which includes the value 4 (the unique identifier assigned to Tenant 4) in the tenant specification field 326, and copies of the values of the key fields 320, 322. Further, the hidebit corresponding to the column assigned to Tenant 4 (e.g., the fifth column of the row visibility field 328, the first column being designated to the shared tenant, Tenant 0). Consequently, subsequent to the change, Tenant 4 is only able to view the changed data of row 342, and is no longer able to view the corresponding shared data.

An update instruction can be executed to perform edits to the shared table 314 in view of the changes implemented by Tenant 4. An example portion of an update instruction can include:

UPDATE . . . SET"/MT/HIDEBITS"=BITSET("/MT/HIDEBITS", 4, 1) WHERE "/MT/TENANT"=0 AND . . .

In some examples, the before-insert-trigger sets the hidebits in particular circumstances. For example, the before-insert-trigger can set hidebits in the case that a tenant-local rows exist (e.g., tenant>0) without a shared tenant row (tenant=0), where a tenant 0 row is inserted. Without setting the hidebits in the trigger, the data would be inconsistent. The hidebits are set for all tenants (e.g., tenant>0) that already have such a row.

In some implementations, a tenant is able to delete changed data from the shared table 314. For example, and with reference to FIG. 3D, Tenant 1 is able to delete the row 340, which was added as a result of Tenant 1 changing shared data, as described above.

Figure 4:
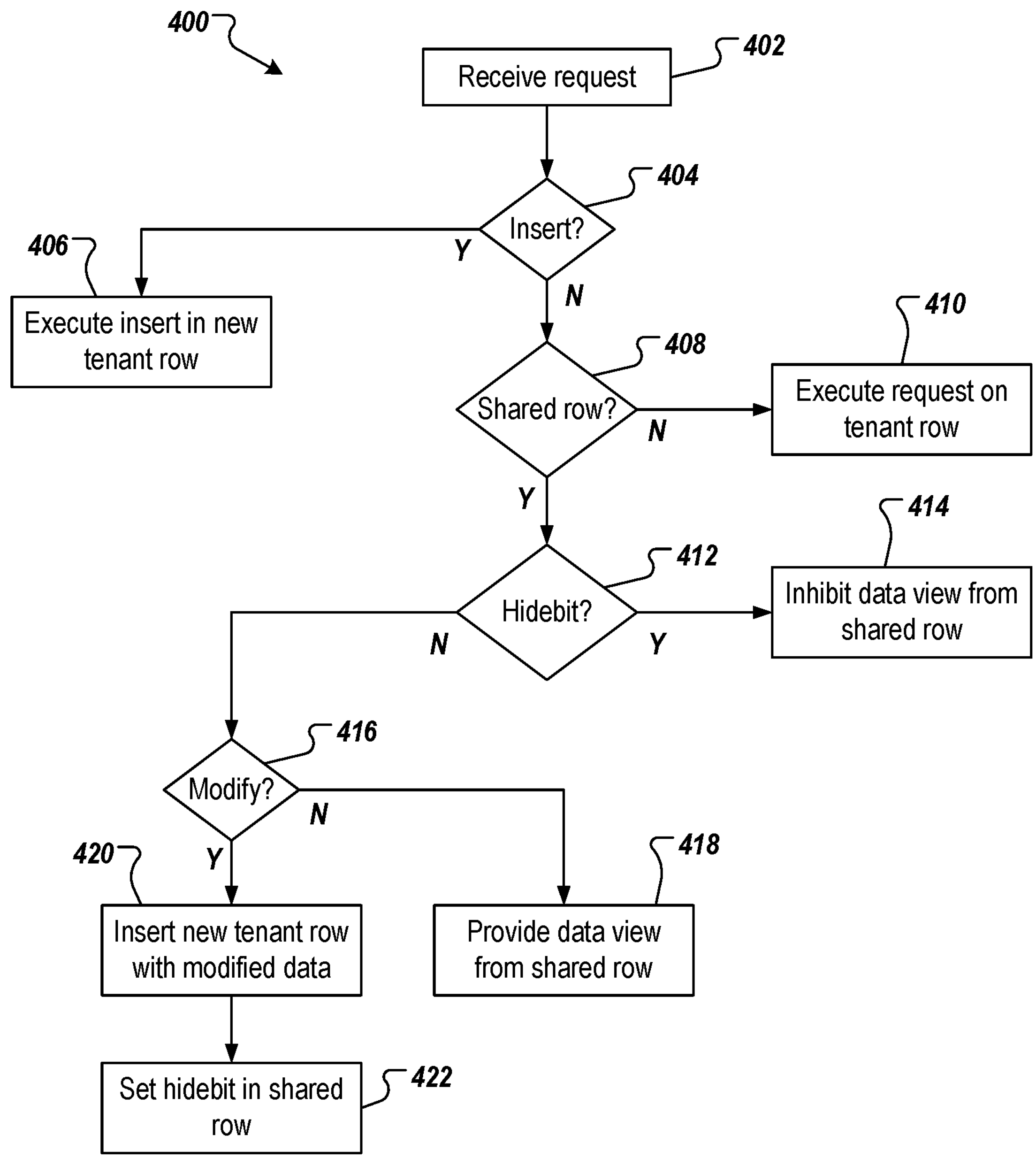
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

A request is received (402). For example, a tenant can submit a request to a database system (e.g., a tenant application executing on an application server). It is determined whether the request includes an insert command (404). For example, it can be determined that the tenant is requesting to insert a new row into a shared table. If it is determined that the request includes an insert command, a new row is inserted in the shared table, and a value of a tenant specification field of the row is set to the identifier assigned to the tenant (406).

If it is determined that the request does not include an insert command, it is determined whether a row implicated by the request is a shared row (408). For example, it is determined whether a row implicated by the request (e.g., a row, of which data is to be edited) has a value indicating a shared row in the tenant specification field (e.g., tenant=0). If the request does not implicate a shared row, the request is executed on the row (410). For example, the request is executed on a row that is specific to the tenant submitting the request.

If the row is a shared row, it is determined whether a hidebit is set of the particular tenant (412). For example, it is determined whether the hidebit is set in a column corresponding to the tenant that submitted the request. If the hidebit is set, a data view from the shared row is inhibited (414). That is, the tenant is unable to view data of the shared row.

If the hidebit is not set, it is determined whether the request includes a modification (416). For example, it can be determined that the request includes a request to edit data stored in the row. If the request does not include a modification, a data view is provided from the shared row (418). That is, for example, data of the shared row is provided to the tenant for viewing. If the request does include a modification, a new tenant row is inserted with the modified data (420), and the hidebit for the tenant is set in the shared row (422).

Implementations of the present disclosure provide one or more of the following example advantages. Implementations enable relatively quick, and resource-efficient creation of tenants, as only views and triggers have to be created in the database, and no tables, and/or no table content has to be deployed. Further, the cost-overhead in the database for a new tenant is minimal, as only database catalog objects are created. Accordingly, no memory is consumed and no storage on disk for default data is needed. In some examples, default data is "de-duplicated" and stored only once, even if consumed by a large number of tenants. In this manner, memory is further conserved. In some examples, no additional tenant-specific persistency has to be created for storing tenant data, and not to store modify or delete information regarding default content. Shipment of new default is optimized, as data is written only once to the shared schema and not for every tenant.

Figure 5:
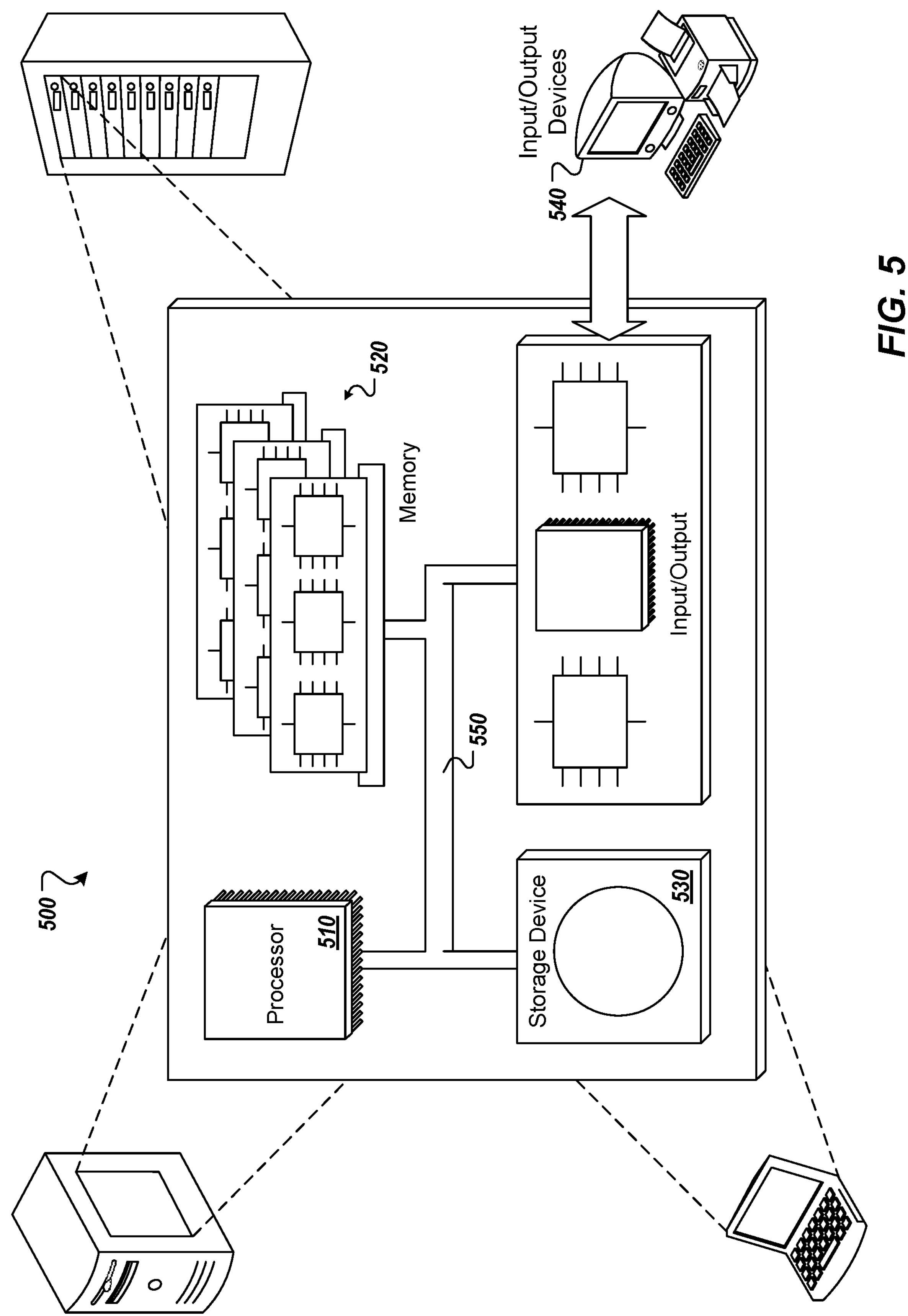
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing access to, and modification of shared data in multi-tenant systems, the computer-implemented method being executed by one or more processors and comprising:

providing, by the one or more processors, a database system that each tenant system of a plurality of tenant systems interacts with;

providing, by the one or more processors, a shared database schema and a plurality of tenant database schemas in the database system, the shared database schema comprising at least one shared table, a view into the at least one shared table, the at least one shared table comprising a read-write table storing shared data and tenant-specific data, and each row of the at least one shared table being assigned to a specific tenant and comprising a tenant specification field, a data field, and a row visibility field, the tenant specification field indicating a specific tenant, to which a respective row is assigned, the data field storing shared data when a tenant specification value of the tenant specification field indicates a shared tenant and tenant-specific data when the tenant specification value of the tenant specification field indicates a tenant in the respective row, and the row visibility field indicating visibility of a respective row to respective tenants;

for a first tenant:

reading shared data from the at least one shared table based on a first view of a first tenant database schema, the first view comprising a view into the at least one shared table and defining at least two tenant specification values including the tenant specification value indicating the shared tenant, and a hidebit column corresponding to the first tenant in the row visibility field, the shared data being stored in a row having the tenant specification value assigned to the shared tenant, and having an unset hidebit corresponding to the first tenant in the hidebit column corresponding to the first tenant in the row visibility field, and transmitting the shared data to the first tenant; and for a second tenant:

inhibiting reading of shared data from the at least one shared table, the shared data being stored in a row having one of a tenant specification value assigned to another tenant, and a set hidebit corresponding to the second tenant.

2. The computer-implemented method of claim 1, further comprising:

inserting a first row in the shared table, the first row comprising changed data based on shared data stored in a second row of the shared table; and setting a hidebit corresponding to the first tenant in the second row of the shared table to inhibit reading of the shared data in the second row by the first tenant.

3. The computer-implemented method of claim 1, further comprising:

inserting a first row in the shared table, the first row comprising data being stored to the shared table by the first tenant; and setting a value within a tenant specification field of the first row to a unique identifier assigned to the first tenant.

4. The computer-implemented method of claim 1, further comprising, for the first tenant:

identifying one or more rows storing tenant-specific data that is specific to the first tenant based on values within respective tenant specification fields of the one or more rows; and transmitting the tenant-specific data to the first tenant.

5. The computer-implemented method of claim 1, further comprising, for the second tenant:

identifying one or more rows storing tenant-specific data that is specific to the second tenant based on values within respective tenant specification fields of the one or more rows; and transmitting the tenant-specific data to the second tenant.

6. The computer-implemented method of claim 1, wherein each tenant database schema corresponds to a respective instance of a cloud-based application for a respective tenant.

7. The computer-implemented method of claim 1, wherein at least one tenant database schema comprises a local table storing tenant-specific data therein.

8. A non-transitory computer-readable storage medium coupled to one or more processors and having instructions stored thereon which, when executed by the one or more processors, cause the one or more processors to perform operations for managing access to, and modification of shared data in multi-tenant systems, the operations comprising:

providing a database system that each tenant system of a plurality of tenant systems interacts with;

providing a shared database schema and a plurality of tenant database schemas in the database system, the shared database schema comprising at least one shared table, a view into the at least one shared table, the at least one shared table comprising a read-write table storing shared data and tenant-specific data, and each row of the at least one shared table being assigned to a specific tenant and comprising a tenant specification field, a data field, and a row visibility field, the tenant specification field indicating a specific tenant, to which a respective row is assigned, the data field storing shared data when a tenant specification value of the tenant specification field indicates a shared tenant and tenant-specific data when the tenant specification value of the tenant specification field indicates a tenant in the respective row, and the row visibility field indicating visibility of a respective row to respective tenants;

for a first tenant:

reading shared data from the at least one shared table based on a first view of a first tenant database schema, the first view comprising a view into the at least one shared table and defining at least two tenant specification values including the tenant specification value indicating the shared tenant, and a hidebit column corresponding to the first tenant in the row visibility field, the shared data being stored in a row having the tenant specification value assigned to the shared tenant, and having an unset hidebit corresponding to the first tenant in the hidebit column corresponding to the first tenant in the row visibility field, and transmitting the shared data to the first tenant; and for a second tenant:

inhibiting reading of shared data from the at least one shared table, the shared data being stored in a row having one of a tenant specification value assigned to another tenant, and a set hidebit corresponding to the second tenant.

9. The non-transitory computer-readable storage medium of claim 8, wherein operations further comprise:

inserting a first row in the shared table, the first row comprising changed data based on shared data stored in a second row of the shared table; and setting a hidebit corresponding to the first tenant in the second row of the shared table to inhibit reading of the shared data in the second row by the first tenant.

10. The non-transitory computer-readable storage medium of claim 8, wherein operations further comprise:

inserting a first row in the shared table, the first row comprising data being stored to the shared table by the first tenant; and setting a value within a tenant specification field of the first row to a unique identifier assigned to the first tenant.

11. The non-transitory computer-readable storage medium of claim 8, wherein operations further comprise, for the first tenant:

identifying one or more rows storing tenant-specific data that is specific to the first tenant based on values within respective tenant specification fields of the one or more rows; and transmitting the tenant-specific data to the first tenant.

12. The non-transitory computer-readable storage medium of claim 8, wherein operations further comprise, for the second tenant:

identifying one or more rows storing tenant-specific data that is specific to the second tenant based on values within respective tenant specification fields of the one or more rows; and transmitting the tenant-specific data to the second tenant.

13. The non-transitory computer-readable storage medium of claim 8, wherein each tenant database schema corresponds to a respective instance of a cloud-based application for a respective tenant.

14. The non-transitory computer-readable storage medium of claim 8, wherein at least one tenant database schema comprises a local table storing tenant-specific data therein.

15. A system, comprising:

a computing device; and a computer-readable storage device coupled to the computing device and having instructions stored thereon which, when executed by the computing device, cause the computing device to perform operations for managing access to, and modification of shared data in multi-tenant systems, the operations comprising:

providing a database system that each tenant system of a plurality of tenant systems interacts with;

providing a shared database schema and a plurality of tenant database schemas in the database system, the shared database schema comprising at least one shared table, a view into the at least one shared table, the at least one shared table comprising a read-write table storing shared data and tenant-specific data, and each row of the at least one shared table being assigned to a specific tenant and comprising a tenant specification field, a data field, and a row visibility field, the tenant specification field indicating a specific tenant, to which a respective row is assigned, the data field storing shared data when a tenant specification value of the tenant specification field indicates a shared tenant and tenant-specific data when the tenant specification value of the tenant specification field indicates a tenant in the respective row, and the row visibility field indicating visibility of a respective row to respective tenants;

for a first tenant:

reading shared data from the at least one shared table based on a first view of a first tenant database schema, the first view comprising a view into the at least one shared table and defining at least two tenant specification values including the tenant specification value indicating the shared tenant, and a hidebit column corresponding to the first tenant in the row visibility field, the shared data being stored in a row having the tenant specification value assigned to the shared tenant, and having an unset hidebit corresponding to the first tenant in the hidebit column corresponding to the first tenant in the row visibility field, and transmitting the shared data to the first tenant; and for a second tenant:

inhibiting reading of shared data from the at least one shared table, the shared data being stored in a row having one of a tenant specification value assigned to another tenant, and a set hidebit corresponding to the second tenant.

16. The system of claim 15, wherein operations further comprise:

inserting a first row in the shared table, the first row comprising changed data based on shared data stored in a second row of the shared table; and setting a hidebit corresponding to the first tenant in the second row of the shared table to inhibit reading of the shared data in the second row by the first tenant.

17. The system of claim 15, wherein operations further comprise:

inserting a first row in the shared table, the first row comprising data being stored to the shared table by the first tenant; and setting a value within a tenant specification field of the first row to a unique identifier assigned to the first tenant.

18. The system of claim 15, wherein operations further comprise, for the first tenant:

identifying one or more rows storing tenant-specific data that is specific to the first tenant based on values within respective tenant specification fields of the one or more rows; and transmitting the tenant-specific data to the first tenant.

19. The system of claim 15, wherein operations further comprise, for the second tenant:

identifying one or more rows storing tenant-specific data that is specific to the second tenant based on values within respective tenant specification fields of the one or more rows; and transmitting the tenant-specific data to the second tenant.

20. The system of claim 15, wherein each tenant database schema corresponds to a respective instance of a cloud-based application for a respective tenant.

* * * * *